United States Patent
Himmler et al.

(10) Patent No.: US 12,436,236 B2
(45) Date of Patent: Oct. 7, 2025

(54) METHOD AND SYSTEM FOR TESTING A RADAR SENSOR FOR AN ACTIVE ENVIRONMENT SENSING SYSTEM

(71) Applicant: dSPACE GmbH, Paderborn (DE)

(72) Inventors: Andreas Himmler, Paderborn (DE); Jeffrey Paul, Torrance, CA (US); Jonathan Watkins, Los Angeles, CA (US); Alexander Trapp, Paderborn (DE)

(73) Assignee: DSPACE GMBH, Paderborn (DE)

( * ) Notice: Subject to any disclaimer, the term of this patent is extended or adjusted under 35 U.S.C. 154(b) by 417 days.

(21) Appl. No.: 17/948,287

(22) Filed: Sep. 20, 2022

(65) Prior Publication Data

US 2024/0094339 A1    Mar. 21, 2024

(51) Int. Cl.
*G01S 7/40* (2006.01)

(52) U.S. Cl.
CPC ...................... *G01S 7/40* (2013.01)

(58) Field of Classification Search
CPC ..................................... G01S 13/931
USPC .................................. 342/165, 169
See application file for complete search history.

(56) References Cited

U.S. PATENT DOCUMENTS

| | | | | |
|---|---|---|---|---|
| 3,665,616 A | * | 5/1972 | Basard | G01S 7/4052 342/171 |
| 4,613,863 A | * | 9/1986 | Mitchell | G01S 7/38 342/14 |
| 4,656,480 A | * | 4/1987 | Allezard | G01S 13/44 342/151 |
| 4,847,622 A | * | 7/1989 | Maitre | G01S 13/532 342/111 |
| 5,831,569 A | * | 11/1998 | Schultheis | G01S 7/282 342/204 |
| 7,197,279 B2 | * | 3/2007 | Bellantoni | G06K 7/10316 375/334 |
| 7,239,858 B2 | * | 7/2007 | Bellantoni | H04B 1/401 455/288 |
| 7,595,641 B1 | * | 9/2009 | Mehr | G01R 33/36 324/318 |
| 9,151,828 B2 | * | 10/2015 | Shipley | H01Q 21/225 |
| 10,116,029 B2 | * | 10/2018 | Wang | H01P 1/38 |
| 10,852,394 B2 | * | 12/2020 | Salvesen | G01S 7/285 |
| 10,866,308 B2 | * | 12/2020 | Salvesen | G01S 7/285 |
| 11,143,745 B2 | * | 10/2021 | Ahmed | G01S 7/4052 |

(Continued)

FOREIGN PATENT DOCUMENTS

DE    102018208464 A1 * 12/2019    ........... G01S 13/931

*Primary Examiner* — Michael W Justice
(74) *Attorney, Agent, or Firm* — LEYDIG, VOIT & MAYER, LTD.

(57) ABSTRACT

A testing system of a radar sensor for an active environment sensing system includes: a first target simulator, comprising: a first electronic control unit; a first receive antenna, connected to the first electronic control unit, for receiving a radar sensor signal; and a first transmit antenna, connected to the first electronic control unit, for emitting a first radar echo generated by the first electronic control unit; and a second target simulator, comprising: a second electronic control unit; a second receive antenna, connected to the second electronic control unit, for receiving a radar sensor signal; and a second transmit antenna, connected to the second electronic control unit, for emitting a second radar echo generated by the second electronic control unit.

14 Claims, 4 Drawing Sheets

(56) References Cited

U.S. PATENT DOCUMENTS

| | | | | |
|---|---|---|---|---|
| 11,313,958 B2* | 4/2022 | Kong | | G01S 7/4052 |
| 11,415,668 B2* | 8/2022 | Gruber | | G01S 7/4052 |
| 11,486,963 B2* | 11/2022 | Kong | | G01S 7/4052 |
| 11,686,814 B2* | 6/2023 | Vook | | G01S 13/931 |
| | | | | 342/165 |
| 11,867,832 B2* | 1/2024 | Vanwiggeren | | G01S 13/931 |
| 11,914,070 B2* | 2/2024 | Hamberger | | G01S 13/931 |
| 11,933,912 B2* | 3/2024 | Hamberger | | G01S 7/40 |
| 11,933,913 B2* | 3/2024 | Nishimura | | G01S 7/4056 |
| 11,936,108 B2* | 3/2024 | Hamberger | | H01Q 15/14 |
| 12,045,699 B2* | 7/2024 | DePoy | | H04B 17/318 |
| 2005/0140457 A1* | 6/2005 | Bellantoni | | G06K 7/0008 |
| | | | | 340/10.1 |
| 2005/0143026 A1* | 6/2005 | Bellantoni | | H04B 1/0458 |
| | | | | 455/121 |
| 2005/0231367 A1* | 10/2005 | Bellantoni | | G06K 7/0008 |
| | | | | 340/572.1 |
| 2009/0224762 A1* | 9/2009 | Mehr | | G01R 33/36 |
| | | | | 324/314 |
| 2013/0002474 A1* | 1/2013 | Shipley | | H01Q 21/225 |
| | | | | 342/171 |
| 2015/0369905 A1* | 12/2015 | Shipley | | H01Q 21/225 |
| | | | | 342/171 |
| 2017/0010346 A1* | 1/2017 | Rolfsmeier | | G01S 7/4052 |
| 2017/0010347 A1* | 1/2017 | Schütte | | G01S 7/4052 |
| 2017/0331168 A1* | 11/2017 | Wang | | H01P 1/38 |
| 2017/0363719 A1* | 12/2017 | Ahmed | | G01S 7/4052 |
| 2019/0041496 A1* | 2/2019 | Salvesen | | G01S 7/4052 |
| 2020/0103497 A1* | 4/2020 | Ahmed | | G01S 7/4052 |
| 2020/0300968 A1* | 9/2020 | Gruber | | G01S 7/4052 |
| 2020/0319325 A1* | 10/2020 | Kong | | G01S 7/4021 |
| 2020/0363503 A1* | 11/2020 | Salvesen | | G01S 7/4052 |
| 2021/0055382 A1* | 2/2021 | Kong | | G01S 7/4052 |
| 2021/0132190 A1* | 5/2021 | Nishimura | | G01S 7/4056 |
| 2021/0341572 A1* | 11/2021 | Hamberger | | G01S 7/4052 |
| 2021/0373122 A1* | 12/2021 | Hamberger | | G01S 7/4026 |
| 2022/0018934 A1* | 1/2022 | Lee | | G01S 7/4034 |
| 2022/0037797 A1* | 2/2022 | Hamberger | | H01Q 15/14 |
| 2022/0179043 A1* | 6/2022 | Vook | | G01S 7/40 |
| 2022/0187442 A1* | 6/2022 | Kang | | G01S 7/4052 |
| 2022/0260674 A1* | 8/2022 | Vanwiggeren | | G01S 13/931 |
| 2023/0144796 A1* | 5/2023 | DePoy | | G06N 20/00 |
| | | | | 706/12 |
| 2024/0183942 A1* | 6/2024 | Nishimura | | G01S 7/4056 |

\* cited by examiner

METHOD AND SYSTEM FOR TESTING A RADAR SENSOR FOR AN ACTIVE ENVIRONMENT SENSING SYSTEM

FIELD

The present invention relates to a testing system of a radar sensor for an active environment sensing system.

The present invention further relates to a computer-implemented method for testing a radar sensor for an active environment sensing system.

In addition, the invention relates to a computer program comprising program code for carrying out a method according to the invention.

BACKGROUND

Active environment sensing systems are generally intended for safety-critical functions, for example steering an automated vehicle, so the proper functioning of the systems must be ensured before they are deployed.

An environment sensing system should be understood as a computer system that is equipped with sensors and can independently sense objects in its surroundings. In the automotive industry in particular, there is currently a trend toward automation, as part of which vehicles are increasingly being equipped with environment sensing systems. However, systems of this kind are also being used in other sectors, for example robotics, traffic monitoring, or airspace monitoring.

There is a distinction between passive systems, which are configured merely as signal receivers, and active systems, which independently output signals to detect objects on the basis of the echo signals reflected thereby. With the current state of the art, active environment sensing systems are usually based on ultrasound, radio waves, or laser light.

To be able to test active environment sensing systems safely and reproducibly, there are target simulators available on the market, i.e., test benches or test bench components that emulate operation in a customary environment using artificially generated echoes for an active environment sensing system positioned in or in front of the target simulator as the unit under test. Components of a target simulator include a receiving device in a first signal path for registering a wirelessly transmitted sampling signal generated by the unit under test, a transmission device in a second signal path for generating a time-delayed echo signal, and a simulator unit.

In a radar target simulator, the receiving device has, in addition to an electronic control unit, a first antenna for receiving a radar signal from a unit under test configured as a radar system. The transmission device further has a second antenna for sending out a radar signal so as to simulate a radar echo of a radar signal received at the first antenna.

By way of example, the first antenna for receiving the radar signal from the unit under test configured as the radar system, and the second antenna for sending out the radar signal may be configured as separate antennas or as a combined transmit/receive antenna.

Currently, however, systems composed of radar target simulators that can simulate at least two targets may only be used in the following configurations.

In a first configuration, the two targets are simulated from one physical front end or electronic control unit. A radar sensor detects the targets from exactly the same direction, thereby optimally enabling a distance and Doppler separation test, for example.

In a second configuration, the two targets are simulated from two physical front ends, i.e., one target per front end. A radar sensor always detects the targets from different directions, thereby enabling angle separation tests.

In addition, the mechanical positioning of the front ends in relation to one another allows the separation angle to be monitored continuously. This, however, may lead to errors in the distance and Doppler separation tests, for which, however, the first configuration is optimal.

Previous solutions to this problem involve using systems comprising a total of three simulated targets: two from the first front end and one from the second. This solution allows the problem to be sidestepped by using additional materials since hardware is then used to simulate an additional target. However, this is cost-intensive since additional hardware has to be provided.

Another previous solution involves a reconfiguration between the aforementioned first and second configurations using hardware adjustments, such as plugging cables into different sockets or adding additional components that split or combine signals to the signal path or removing them therefrom. However, this is time-consuming and may lead to errors in the orientation of the front ends owing to the mechanical intervention.

Consequently, there is a need to provide a testing system and testing methods of a radar sensor for an active environment sensing system that provide a more cost-effective and less time-consuming solution for simulating a plurality of targets from one physical front end and for simulating a plurality of targets from two physical front ends.

SUMMARY

In an exemplary embodiment, the present invention provides a testing system of a radar sensor for an active environment sensing system. The testing system includes: a first target simulator, comprising: a first electronic control unit; a first receive antenna, connected to the first electronic control unit, for receiving a radar sensor signal; and a first transmit antenna, connected to the first electronic control unit, for emitting a first radar echo generated by the first electronic control unit; and a second target simulator, comprising: a second electronic control unit; a second receive antenna, connected to the second electronic control unit, for receiving a radar sensor signal; and a second transmit antenna, connected to the second electronic control unit, for emitting a second radar echo generated by the second electronic control unit. The first target simulator and/or the second target simulator is/are set up so as to perform a reconfiguration between a first test, in which the first target simulator and the second target simulator simulate a plurality of targets by way of the first transmit antenna or by way of the second transmit antenna, and a second test, in which, respectively, the first target simulator simulates a target by way of the first transmit antenna and the second target simulator simulates a target by way of the second transmit antenna.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
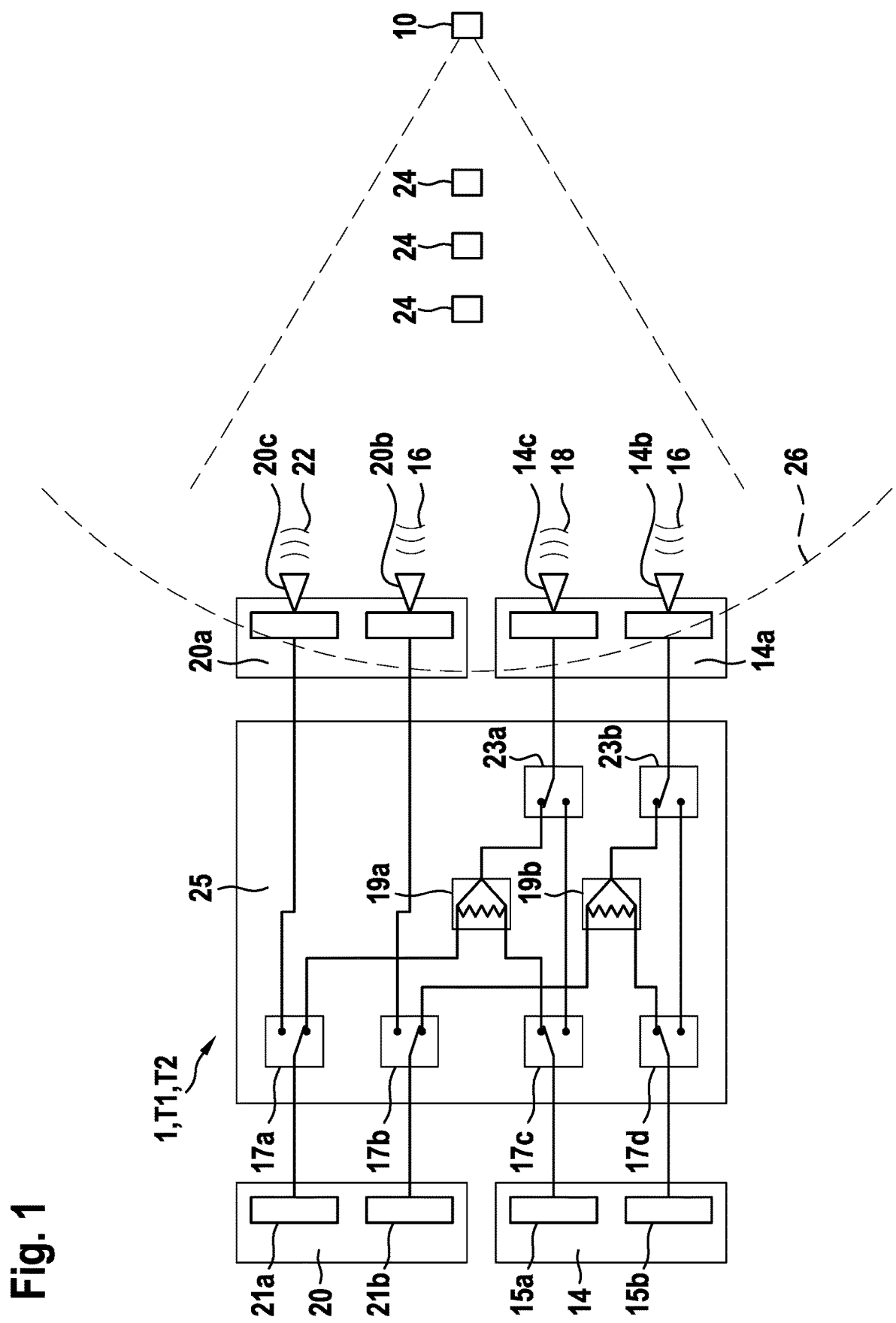
FIG. 1 is a schematic illustration of a first configuration of a testing system of a radar sensor for an active environment sensing system according to an embodiment of the invention.

Exemplary embodiments of the invention provide an improved method and system for testing a radar sensor for an active environment sensing system that provide a more cost-effective and less time-consuming solution for simulating a plurality of targets from one physical front end and for simulating a plurality of targets from two physical front ends.

The invention relates to a testing system of a radar sensor for an active environment sensing system.

The system comprises a first target simulator, which comprises a first electronic control unit, a first receive antenna, connected to the first electronic control unit, for receiving a radar sensor signal, and a first transmit antenna, connected to the first electronic control unit, for emitting a first radar echo generated by the first electronic control unit.

The system further comprises a second target simulator, which comprises a second electronic control unit, a second receive antenna, connected to the second electronic control unit, for receiving a radar sensor signal, and a second transmit antenna, connected to the second electronic control unit, for emitting a second radar echo generated by the second electronic control unit, the first target simulator and/or the second target simulator being set up so as to perform a reconfiguration between a first test, in which the first target simulator simulates a plurality of targets by way of the first transmit antenna or the second target simulator simulates a plurality of targets by way of the second transmit antenna, and a second test, in which, respectively, the first target simulator simulates a target by way of the first transmit antenna and the second target simulator simulates a target by way of the second transmit antenna.

The invention further relates to a testing system of a radar sensor for an active environment sensing system.

The system comprises a target simulator, which comprises an electronic control unit, a first receive antenna, connected to the electronic control unit, for receiving a radar sensor signal, and a first transmit antenna, connected to the electronic control unit, for emitting a radar echo generated by the electronic control unit, the target simulator further comprising a second receive antenna, connected to the electronic control unit, for receiving a radar sensor signal, and a second transmit antenna, connected to the electronic control unit, for emitting a radar echo generated by the electronic control unit, the target simulator being set up so as to perform a reconfiguration between a first test, in which the target simulator simulates a first target by way of the first transmit antenna, and a second test, in which the target simulator simulates a second target by way of the second transmit antenna.

By way of example, the first receive antenna and the first transmit antenna, and the second receive antenna and the second transmit antenna may each be configured as separate antennas or each be configured as a combined transmit/receive antenna.

In addition, the invention relates to a computer-implemented method for testing a radar sensor for an active environment sensing system.

The method comprises providing a first target simulator, which comprises a first electronic control unit, a first receive antenna, connected to the first electronic control unit, for receiving a radar sensor signal, and a first transmit antenna, connected to the first electronic control unit, for emitting a first radar echo generated by the first electronic control unit.

The method further relates to providing a second target simulator, which comprises a second electronic control unit, a second receive antenna, connected to the second electronic control unit, for receiving a radar sensor signal, and a second transmit antenna, connected to the second electronic control unit, for emitting a second radar echo generated by the second electronic control unit.

The method additionally relates to performing, using the first target simulator and/or the second target simulator, a reconfiguration between a first test, in which the first target simulator simulates a plurality of targets by way of the first transmit antenna or the second target simulator simulates a plurality of targets by way of the second transmit antenna, and a second test, in which, respectively, the first target simulator simulates a target by way of the first transmit antenna and the second target simulator simulates a target by way of the second transmit antenna.

The invention further relates to a computer-implemented method for testing a radar sensor for an active environment sensing system.

The method comprises providing a target simulator, which comprises an electronic control unit, a first receive antenna, connected to the electronic control unit, for receiving a radar sensor signal, a first transmit antenna, connected to the electronic control unit, for emitting a radar echo generated by the electronic control unit, a second receive antenna, connected to the electronic control unit, for receiving a radar sensor signal, and a second transmit antenna, connected to the electronic control unit, for emitting a radar echo generated by the electronic control unit.

The method further relates to performing, using the target simulator, a reconfiguration between a first test, in which the target simulator simulates a first target by way of the first transmit antenna, and a second test, in which the target simulator simulates a second target by way of the second transmit antenna.

The environment sensing system comprises the radar sensor and further components (not specified further) that are needed in order to execute an automated vehicle function of a motor vehicle using the radar sensor, for example. In this regard, the testing system according to the invention is configured to test the radar sensor for the environment sensing system. However, the environment sensing system is not part of the testing system for testing the radar sensor.

One concept of the present invention involves adding, between the target simulators and their front ends, a circuit that performs, in an automatic and software-controlled manner, the reconfiguration between the first test, in which the first target simulator simulates a plurality of targets by way of the first transmit antenna or the second target simulator simulates a plurality of targets by way of the second transmit antenna, and the second test, in which, respectively, the first target simulator simulates a target by way of the first transmit antenna and the second target simulator simulates a target by way of the second transmit antenna.

Therefore, there is now no need for any manual mechanical reconfiguration on the testing system or any additional target simulator in order to perform separation tests for the parameters of distance, Doppler, and angle.

In addition, the invention reduces the number of target simulators required in order to map dynamic driving situations that require a plurality of targets at different angles or at the same angle at different times. More efficient use of hardware is thus provided.

Furthermore, the invention makes it possible to map additional applications that otherwise require more extensive hardware expansions. Where there are N base units for the target simulation, the present invention makes it possible to simulate N targets from one angle or, at the other extreme, one target from each of N angles, and everything in between.

Further embodiments of the present invention are set out in the description below, with reference to the drawings.

According to an embodiment of the invention, the first target simulator and/or the second target simulator is/are set up in order, in the first test, to simulate a plurality of targets at the same angle to the radar sensor. Advantageously, therefore, a plurality of targets may be simulated by the same target simulator.

According to another embodiment of the invention, the first target simulator and the second target simulator are set up in order, in the second test, to simulate a plurality of targets at different angles to the radar sensor. By way of example, different road users may thus be simulated in order to depict a scenario such as an overtaking maneuver and/or a lane change.

According to another embodiment of the invention, the first transmit antenna and the first receive antenna of the first target simulator, and the second transmit antenna and the second receive antenna of the second target simulator are arranged so as to be movable relative to the radar sensor along a link.

This allows objects to be simulated at varying angles to the radar sensor, i.e., allows the object to move laterally and/or longitudinally relative to the radar sensor.

According to another embodiment of the invention, the first transmit antenna and the first receive antenna of the first target simulator, and the second transmit antenna and the second receive antenna of the second target simulator are arranged so as to be static relative to the radar sensor along a link.

By arranging the antennas statically along the link, the sensing range of the radar sensor can be tested and predetermined or standardized tests can be performed repeatedly, for example.

According to another embodiment of the invention, the link has a predetermined curvature, the size of which covers at least one sensing angle of the radar sensor. Simulated objects may thus be positioned within an entire sensing range of the radar sensor.

According to another embodiment of the invention, the first target simulator and/or the second target simulator is/are set up so as to perform the reconfiguration between the first test and the second test during an active test execution of the first and/or second test.

Advantageously, therefore, hardware resources can be reduced and a simpler, less time-consuming reconfiguration can be obtained.

According to another embodiment of the invention, the reconfiguration from the second test to the first test can be performed when at least two targets simulated in a sensing range of the radar sensor are sensed by the radar sensor as a target. Consequently, the two objects can advantageously be simulated by a single target simulator.

According to another embodiment of the invention, the first target simulator and/or the second target simulator is/are set up so as to execute the first test for precisely one sensed frame of the radar sensor and to carry out a reconfiguration from the first test to the second test thereafter. As a result, the reconfiguration from the first test to the second test can advantageously be carried out very quickly.

According to another embodiment of the invention, the first test is a distance and/or Doppler separation test and the second test is a scenario-based test of the radar sensor for the active environment sensing system.

The first and/or second simulator may thus cover a plurality of tests efficiently owing to the automated reconfiguration.

According to another embodiment of the invention, the target simulator is set up so as to perform the reconfiguration between the first test and the second test during an active test execution of the first and/or second test. This allows the test to be executed efficiently since the test can continue during the reconfiguration.

The features described herein of the testing system of a radar sensor for an active environment sensing system may likewise be applied to a computer-implemented method according to the invention for testing a radar sensor for an active environment sensing system, and vice versa.

The first configuration of the testing system 1 of a radar sensor 10 for an active environment sensing system as shown in FIG. 1 comprises a first target simulator 14, which comprises a first electronic control unit 14a, a first receive antenna 14b, connected to the first electronic control unit 14a, for receiving a radar sensor signal 16, and a first transmit antenna 14c, connected to the first electronic control unit 14a, for emitting a first radar echo 18 generated by the first electronic control unit 14a.

The testing system 1 further comprises a second target simulator 20, which comprises a second electronic control unit 20a, a second receive antenna 20b, connected to the second electronic control unit 20a, for receiving a radar sensor signal 16, and a second transmit antenna 20c, connected to the second electronic control unit 20a, for emitting a second radar echo 22 generated by the second electronic control unit 20a.

The first target simulator 14 additionally has a first output 15a and a first input 15b. The second target simulator 20 has a first output 21a and a first input 21b.

The first target simulator 14 and the second target simulator 20 are connected to the first electronic control unit 14a and the second electronic control unit 20a via the switching apparatus 25. The switching apparatus 25 can be actuated by the first target simulator 14 and the second target simulator 20 so as to carry out the reconfiguration between the first test T1 and the second test T2.

For this purpose, the switching apparatus 25 has respective switching elements 17a, 17b, 17c, 17d that are connected to further switching elements 23a, 23b via splitters 19a, 19b. In addition, the switching element 17a is directly connected to the second transmit antenna 20c and the switching element 17b is directly connected to the second receive antenna 20b.

Moreover, the switching element 23a is directly connected to the first transmit antenna 14c and the switching element 23b is directly connected to the first receive antenna 14b. The reconfiguration between the first test T1 and the second test T2, and vice versa, can thus be performed by switching the switching elements 17a, 17b, 17c, 17d, 23a, 23b. FIG. 1 shows the configuration of the first test T1.

The first target simulator 14 and/or the second target simulator 20 is/are set up to perform, using the switching apparatus 25, a reconfiguration between a first test T1, in which the first target simulator 14 simulates a plurality of targets 24 by way of the first transmit antenna 14c or the second target simulator 20 simulates a plurality of targets by way of the second transmit antenna 20c, and a second test T2, in which, respectively, the first target simulator 14 simulates a target 24 by way of the first transmit antenna 14c and the second target simulator 20 simulates a target by way of the second transmit antenna 20c.

Furthermore, the first target simulator 14 and/or the second target simulator 20 is/are set up in order, in the first test T1, to simulate a plurality of targets 24 at the same angle to the radar sensor 10.

The first transmit antenna 14c and the first receive antenna 14b of the first target simulator 14, and the second transmit antenna 20c and the second receive antenna 20b of the second target simulator 20 are arranged so as to be movable relative to the radar sensor 10 along a link 26.

Alternatively, the first transmit antenna 14c and the first receive antenna 14b of the first target simulator 14, and the second transmit antenna 20c and the second receive antenna 20b of the second target simulator 20 may be arranged so as to be static relative to the radar sensor 10 along the link 26.

In addition, the link 26 has a predetermined curvature, the size of which covers at least one sensing angle of the radar sensor 10.

In addition, the first target simulator 14 and/or the second target simulator 20 is/are set up so as to perform the reconfiguration between the first test T1 and the second test T2 during an active test execution of the first and/or second test T2.

The reconfiguration from the second test T2 to the first test T1 can be performed when at least two targets 24 simulated in a sensing range of the radar sensor 10 are sensed by the radar sensor 10 as a target 24.

Furthermore, the first target simulator 14 and/or the second target simulator 20 is/are set up so as to execute the first test T1 for precisely one sensed frame of the radar sensor 10 and to carry out a reconfiguration from the first test T1 to the second test T2 thereafter.

Moreover, the first test T1 is a distance and/or Doppler separation test and the second test T2 is a scenario-based test of the radar sensor 10 for the active environment sensing system.

Figure 2:
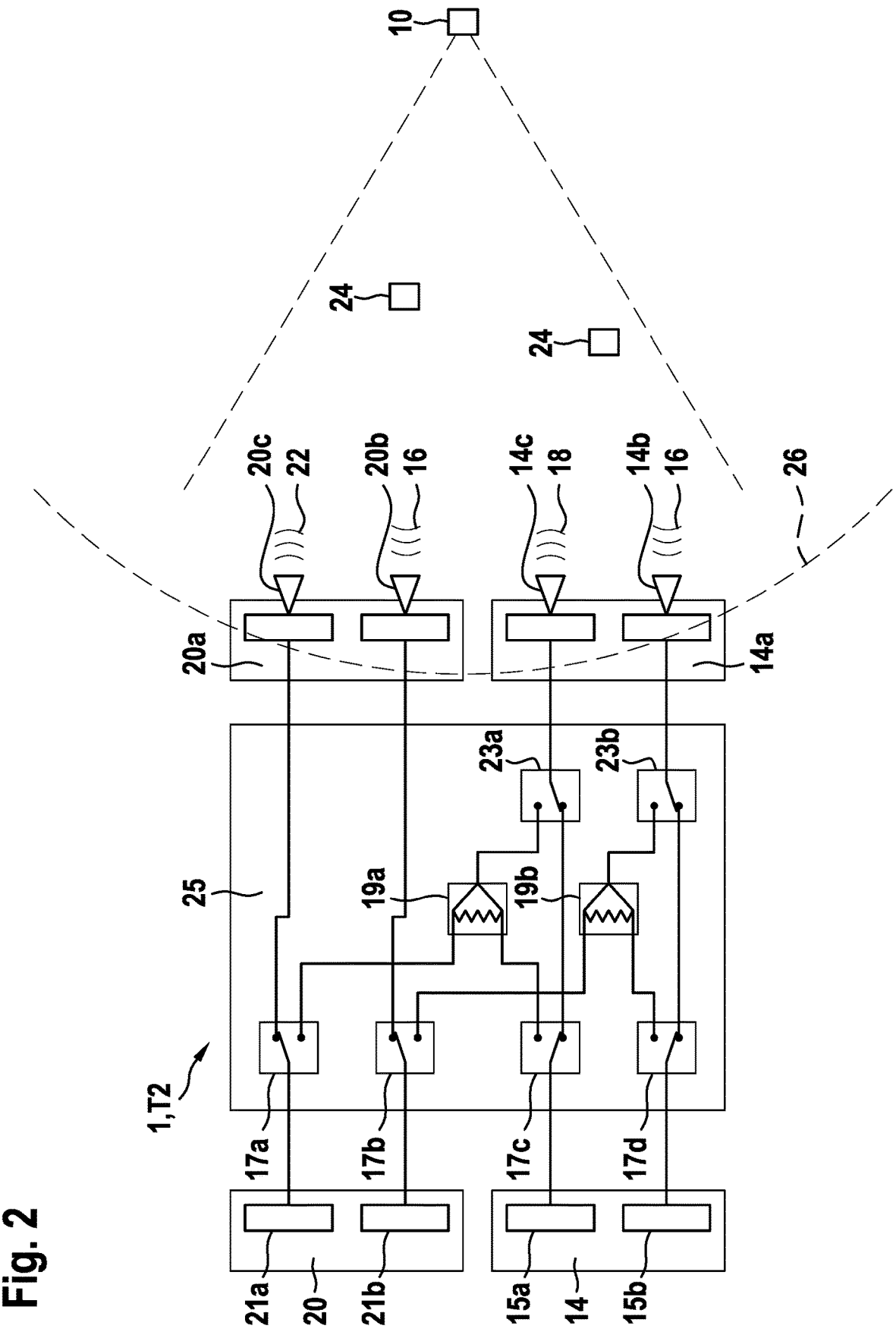
FIG. 2 is a schematic illustration of a second configuration of a testing system of a radar sensor for an active environment sensing system according to an embodiment of the invention.

FIG. 2 is a schematic illustration of a second configuration of the testing system of the radar sensor for the active environment sensing system according to the preferred embodiment of the invention.

In the testing system shown in FIG. 2, a configuration of the second test T2 is shown.

The first target simulator 14 and the second target simulator 20 are set up in order, in the second test T2, to simulate a plurality of targets at different angles to the radar sensor 10.

Figure 3:
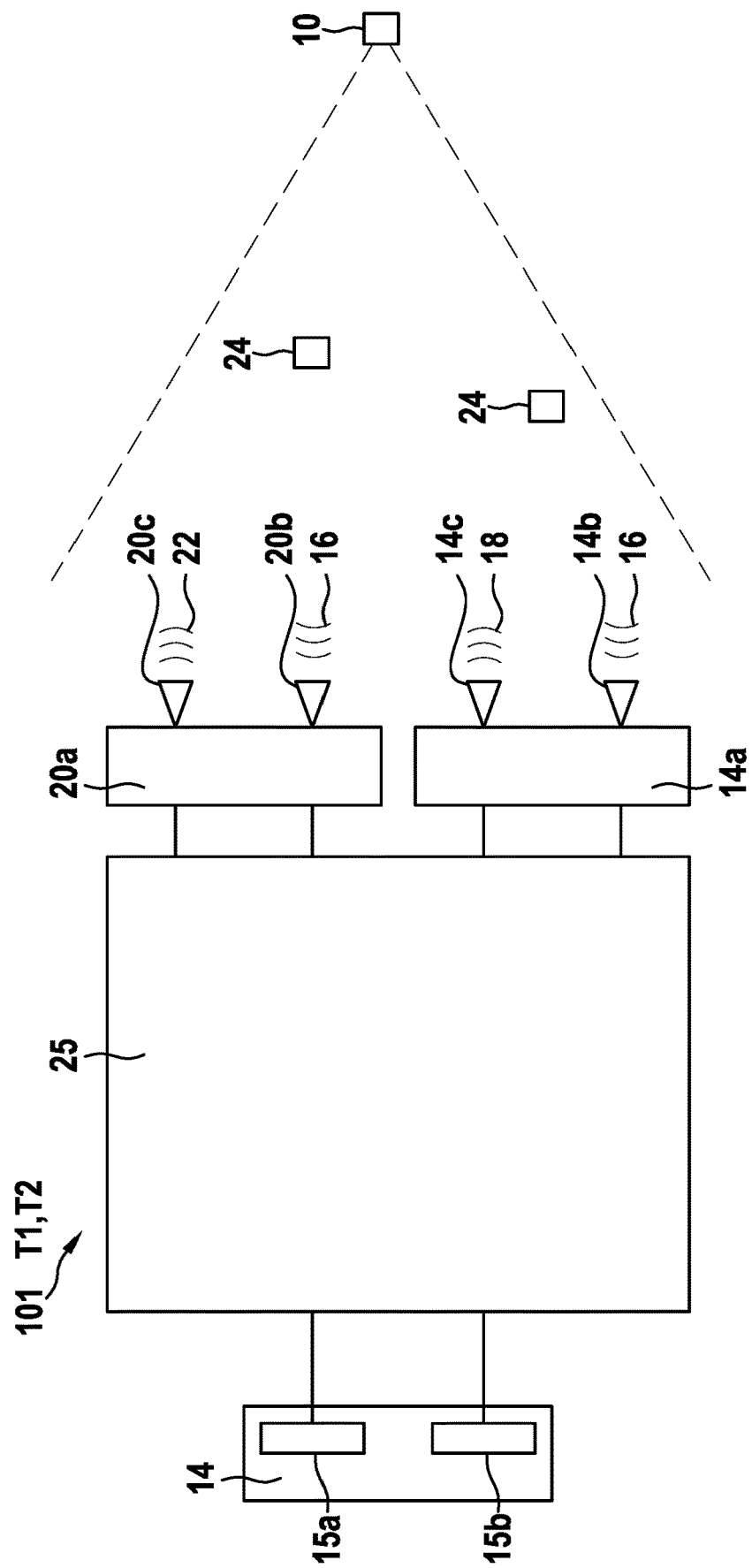
FIG. 3 is a schematic illustration of a further testing system of a radar sensor for an active environment sensing system according to another embodiment of the invention.

FIG. 3 is a schematic illustration of a further testing system 101 of a radar sensor 10 for an active environment sensing system according to another preferred embodiment of the invention.

The testing system 101 comprises a target simulator, which comprises an electronic control unit, a first receive antenna 14b, connected to the electronic control unit, for receiving a radar sensor signal 16, and a first transmit antenna 14c, connected to the electronic control unit, for emitting a radar echo generated by the electronic control unit.

The target simulator further comprises a second receive antenna 20b, connected to the electronic control unit, for receiving a radar sensor signal 16, and a second transmit antenna 20c, connected to the electronic control unit, for emitting a radar echo generated by the electronic control unit, the target simulator being set up so as to perform a reconfiguration between a first test T1, in which the target simulator simulates a first target 24 by way of the first transmit antenna 14c, and a second test T2, in which the target simulator simulates a second target 24 by way of the second transmit antenna 20c.

Furthermore, the target simulator is set up so as to perform the reconfiguration between the first test T1 and the second test T2 during an active test execution of the first and/or second test T2.

Figure 4:
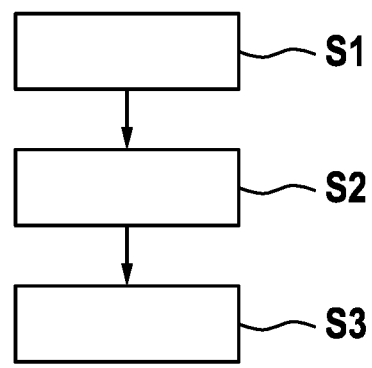
FIG. 4 is a flowchart of a computer-implemented method for testing a radar sensor for an active environment sensing system according to an embodiment of the invention.

FIG. 4 is a flowchart of a computer-implemented method for testing a radar sensor 10 for an active environment sensing system according to the preferred embodiment of the invention.

The method comprises providing S1 a first target simulator 14, which comprises a first electronic control unit 14a, a first receive antenna 14b, connected to the first electronic control unit 14a, for receiving a radar sensor signal 16, and a first transmit antenna 14c, connected to the first electronic control unit 14a, for emitting a first radar echo 18 generated by the first electronic control unit 14a.

The method further comprises providing S2 a second target simulator 20, which comprises a second electronic control unit 20a, a second receive antenna 20b, connected to the second electronic control unit 20a, for receiving a radar sensor signal 16, and a second transmit antenna 20c, connected to the second electronic control unit 20a, for emitting a second radar echo 22 generated by the second electronic control unit 20a.

In addition, the method comprises performing S3, using the first target simulator 14 and/or the second target simulator 20, a reconfiguration between a first test T1, in which the first target simulator 14 simulates a plurality of targets 24 by way of the first transmit antenna 14c or the second target simulator 20 simulates a plurality of targets by way of the second transmit antenna 20c, and a second test T2, in which, respectively, the first target simulator 14 simulates a target 24 by way of the first transmit antenna 14c and the second target simulator 20 simulates a target by way of the second transmit antenna 20c.

Figure 5:
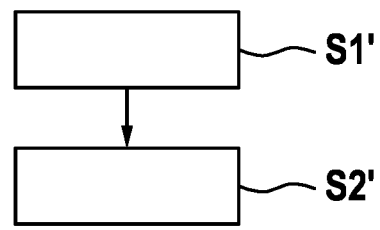
FIG. 5 is a flowchart of a further computer-implemented method for testing a radar sensor for an active environment sensing system according to another embodiment of the invention.

FIG. 5 is a flowchart of a further computer-implemented method for testing a radar sensor 10 for an active environment sensing system according to the other preferred embodiment of the invention.

The method comprises providing S1' a target simulator, which comprises an electronic control unit, a first receive antenna 14b, connected to the electronic control unit, for receiving a radar sensor signal 16, a first transmit antenna 14c, connected to the electronic control unit, for emitting a radar echo generated by the electronic control unit, a second receive antenna 20b, connected to the electronic control unit, for receiving a radar sensor signal 16, and a second transmit antenna 20c, connected to the electronic control unit, for emitting a radar echo generated by the electronic control unit.

The method further comprises performing S2', using the target simulator, a reconfiguration between a first test T1, in which the target simulator simulates a first target 24 by way of the first transmit antenna 14c, and a second test T2, in which the target simulator simulates a second target 24 by way of the second transmit antenna 20c.

Although specific embodiments have been illustrated and described herein, it will be appreciated by a person skilled in the art that a multiplicity of alternative and/or equivalent implementations exist. It should be noted that the exemplary embodiment or exemplary embodiments are only examples and are not intended to limit the scope, applicability, or configuration in any way.

Rather, the foregoing summary and detailed description will provide those skilled in the art with a convenient road map for implementing at least one exemplary embodiment; it goes without saying that various changes may be made in the functional scope and arrangement of elements without departing from the scope of the appended claims and their legal equivalents.

Generally speaking, this application is intended to cover amendments, adaptations, or variations to the embodiments described herein. For example, an order of method steps may be altered. In addition, at least some parts of the method may be carried out sequentially or concurrently.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1, 101 Testing system
10 Radar sensor
14 First target simulator
14a First electronic control unit
14b First receive antenna
14c First transmit antenna
15a First output
15b First input
16 Radar sensor signal
17a Switching element
17b Switching element
17c Switching element
17d Switching element
18 First radar echo
19a Splitter
19b Splitter
20 Second target simulator
20a Second electronic control unit
20b Second receive antenna
20c Second transmit antenna
21a Second output
21b Second input
22 Second radar echo
23a Switching element
23b Switching element
24 Targets
25 Switching apparatus
26 Link
S1-S3 Method steps
S1'-S2' Method steps
T1 First test
T2 Second test

The invention claimed is:

1. A testing system of a radar sensor for an active environment sensing system, comprising:
 a first electronic control unit;
 a first receive antenna, connected to the first electronic control unit, for receiving a radar sensor signal;
 a first transmit antenna, connected to the first electronic control unit, for emitting a first radar echo generated by the first electronic control unit;
 a second electronic control unit;
 a second receive antenna, connected to the second electronic control unit, for receiving a radar sensor signal;
 a second transmit antenna, connected to the second electronic control unit, for emitting a second radar echo generated by the second electronic control unit; and
 a switching apparatus configured to switch the testing system between a first configuration corresponding to a first test and a second configuration corresponding to a second test;
 wherein, as part of the first test, the first transmit antenna or the second transmit antenna is configured to simulate a plurality of targets,
 wherein, as part of the second test, the first and second transmit antennas are configured to simulate first and second targets, respectively, and
 wherein the switching apparatus comprises:
 a first switch connected to a second output and configured to connect and disconnect the second transmit antenna from the second output;
 a second switch connected to a second input and configured to connect and disconnect the second receive antenna from the second input;
 a third switch connected to a first output and configured to connect the first output to the first transmit antenna; and
 a fourth switch connected to a first input and configured to connect the first input to the first receive antenna.

2. The testing system according to claim 1, wherein the plurality of targets simulated as part of the first test are simulated at a same angle to the radar sensor.

3. The testing system according to claim 1, wherein the first and second targets simulated as part of the second test are simulated at different angles to the radar sensor.

4. The testing system according to claim 1, wherein the first transmit antenna, the first receive antenna, the second transmit antenna, and the second receive antenna are movable relative to the radar sensor along a link.

5. The testing system according to claim 1, wherein the first transmit antenna, the first receive antenna, the second transmit antenna, and the second receive antenna of the second target simulator are static relative to the radar sensor along a link.

6. The testing system according to claim 4, wherein the link has a predetermined curvature, the size of which covers at least one sensing angle of the radar sensor.

7. The testing system according to claim 1, wherein the switching apparatus is configured to perform the switching during active test execution of the first test and/or the second test.

8. The testing system according to claim 1, wherein the switching apparatus is configured to perform the switching when at least two targets simulated in a sensing range of the radar sensor are sensed by the radar sensor as a target.

9. The testing system according to claim 8, wherein the switching apparatus is configured to perform the switching after executing the first test for precisely one sensed frame of the radar sensor.

10. The testing system according to claim 1, wherein the first test is a distance and/or Doppler separation test; and
wherein the second test is a scenario-based test of the radar sensor for the active environment sensing system.

11. A method for testing a radar sensor for an active environment sensing system, comprising:
providing a testing system which comprises:
a first electronic control unit,
a first receive antenna, connected to the first electronic control unit, for receiving a radar sensor signal,
a first transmit antenna, connected to the first electronic control unit, for emitting a first radar echo generated by the first electronic control unit,
a second electronic control unit,
a second receive antenna, connected to the second electronic control unit, for receiving a radar sensor signal,
a second transmit antenna, connected to the second electronic control unit, for emitting a second radar echo generated by the second electronic control unit, and
a switching apparatus comprising a first switch connected to a second output and configured to connect and disconnect the second transmit antenna from the second output, a second switch connected to a second input and configured to connect and disconnect the second receive antenna from the second input, a third switch connected to a first output and configured to connect the first output to the first transmit antenna, and a fourth switch connected to a first input and configured to connect the first input to the first receive antenna; and
switching, by the switching apparatus, the testing system between a first configuration corresponding to a first test and a second configuration corresponding to a second test;
wherein, as part of the first test, the first transmit antenna or the second transmit antenna simulates a plurality of targets; and
wherein, as part of the second test, the first and second transmit antennas simulate first and second targets, respectively.

12. A non-transitory computer-readable medium having processor-executable instructions stored thereon for testing a radar sensor for an active environment sensing system using a testing system comprising
a first electronic control unit,
a first receive antenna, connected to the first electronic control unit, for receiving a radar sensor signal,
a first transmit antenna, connected to the first electronic control unit, for emitting a first radar echo generated by the first electronic control unit,
a second electronic control unit,
a second receive antenna, connected to the second electronic control unit, for receiving a radar sensor signal,
a second transmit antenna, connected to the second electronic control unit, for emitting a second radar echo generated by the second electronic control unit, and
a switching apparatus comprising a first switch connected to a second output and configured to connect and disconnect the second transmit antenna from the second output, a second switch connected to a second input and configured to connect and disconnect the second receive antenna from the second input, a third switch connected to a first output and configured to connect the first output to the first transmit antenna, and a fourth switch connected to a first input and configured to connect the first input to the first receive antenna,
wherein the processor-executable instructions, when executed, facilitate performance of the following:
switching, by the switching apparatus, the testing system between a first configuration corresponding to a first test and a second configuration corresponding to a second test;
wherein, as part of the first test, the first transmit antenna or the second transmit antenna simulates a plurality of targets; and
wherein, as part of the second test, the first and second transmit antennas simulate first and second targets, respectively.

13. The testing system according to claim 1, wherein:
the first switch is configured to switch between connecting the second transmit antenna to the second output and connecting the first transmit antenna to the second output;
the second switch is configured to switch between connecting the second receive antenna to the second input and connecting the first receive antenna to the second input;
the third switch is configured to switch between connecting the first transmit antenna to the first output via a first path and a second path; and
the fourth switch is configured to switch between connecting the first receive antenna to the first input via a first path and a second path.

14. The testing system according to claim 13, wherein the first test corresponds to:
the second output being connected to the first transmit antenna via the first switch, a first splitter, and a fifth switch;
the second input being connected to the first receive antenna via the second switch, a second splitter, and a sixth switch;
the first output being connected to the first transmit antenna via the third switch, the first splitter, and the fifth switch; and the first input being connected to the first receive antenna via the fourth switch, the second splitter, and the sixth switch; and wherein the second test corresponds to:
the second output being connected to the second transmit antenna via the first switch;
the second input being connected to the second receive antenna via the second switch;
the first output being connected to the first transmit antenna via the third switch and the fifth switch; and
the first input being connected to the first receive antenna via the fourth switch and the sixth switch.

* * * * *